(12) United States Patent
Baschnagel

(10) Patent No.: US 11,623,801 B2
(45) Date of Patent: Apr. 11, 2023

(54) TIE POST FOR REUSABLE TWIST TIE AND TWIST TIE HAVING TIE POST INTEGRALLY FORMED THEREON

(71) Applicant: Robert J Baschnagel, Garden City, NY (US)

(72) Inventor: Robert J Baschnagel, Garden City, NY (US)

(73) Assignee: NYCE INNOVATIONS, LLC., Canton, MA (US)

( * ) Notice: Subject to any disclaimer, the term of this patent is extended or adjusted under 35 U.S.C. 154(b) by 0 days.

(21) Appl. No.: 17/197,588

(22) Filed: Mar. 10, 2021

(65) Prior Publication Data

US 2022/0289442 A1    Sep. 15, 2022

(51) Int. Cl.
*B65D 63/04* (2006.01)
*F16G 11/04* (2006.01)

(52) U.S. Cl.
CPC ............ *B65D 63/04* (2013.01); *F16G 11/046* (2013.01)

(58) Field of Classification Search
CPC .............................. F16G 11/046; B65D 63/04
See application file for complete search history.

(56) References Cited

U.S. PATENT DOCUMENTS

| | | | |
|---|---|---|---|
| 8,806,723 B2 | 8/2014 | Martinson et al. | |
| 9,480,347 B2* | 11/2016 | Strassburger | A47F 5/0006 |
| 9,850,049 B2* | 12/2017 | Gallup | B65D 63/02 |
| 10,549,895 B2 | 2/2020 | Case et al. | |
| 2011/0286217 A1* | 11/2011 | Martinson | B65D 63/00 362/253 |
| 2013/0037672 A1* | 2/2013 | Sanchez | B60R 7/10 248/303 |
| 2017/0190486 A1 | 7/2017 | Martinson | |

OTHER PUBLICATIONS

International Search Report and Written Opinion of the International Searching Authority dated Jun. 10, 2022 received in PCT/US2022/019452.

* cited by examiner

*Primary Examiner* — Robert Sandy
*Assistant Examiner* — Michael S Lee
(74) *Attorney, Agent, or Firm* — Scully, Scott, Murphy & Presser, P.C.

(57) ABSTRACT

A tie post for use with a reusable twist tie, the tie post including: a first end being configured for removable attachment to the reusable twist tie; a post extending in a longitudinal direction from the first end configured for wrapping an elongated portion of the reusable twist tie around the post; and a second end having a surface for preventing the wrapped elongated portion of the reusable twist tie from moving in the longitudinal direction off of the post. The tie post can also be integrally formed on one of first and second end caps provided on the reusable twist tie.

7 Claims, 15 Drawing Sheets

TIE POST FOR REUSABLE TWIST TIE AND TWIST TIE HAVING TIE POST INTEGRALLY FORMED THEREON

BACKGROUND

Field

The present disclosure relates generally to reusable twist ties (also known as gear ties), and, in particular, relates to a tie post for reusable twist ties and a reusable twist tie having a tie post integrally formed thereon.

Prior Art

Plastic tie wraps are used in many electrical applications as well as non-electrical applications such as keeping things organized and secure. However, such plastic tie wraps can only be used once and must be cut off when no longer desired. In view of such background, reusable twist ties (also known in gear ties) have been developed. Such reusable twist ties generally have a malleable metal internal wire or wires with an outer rubber covering. Such twist ties can come in various lengths and diameters and generally have a small hard plastic knob on each end.

In use, the reusable twist ties tie around another object or objects and ties upon itself for securing the object/objects. However, the degree to which such twist tie can secure the object/objects is limited due to being tied upon itself both from a structural standpoint and because a user usually cannot tie the twist tie upon itself in the most efficient manner.

SUMMARY

Accordingly, a tie post is provided for use with a reusable twist tie. The tie post comprising: a first end being configured for removable attachment to the reusable twist tie; a post extending in a longitudinal direction from the first end configured for wrapping an elongated portion of the reusable twist tie around the post; and a second end having a surface for preventing the wrapped elongated portion of the reusable twist tie from moving in the longitudinal direction off of the post.

The first end can comprises a first portion integrally formed with the post and a second portion removably attached to the first portion. The first portion can have one of a concavity and a projection and the second portion can have the other of the concavity and the projection where the second portion is configured to elastically deform such that the projection mates with the concavity.

The first end can have a c-shape in cross section, where the first portion can be configured to elastically deform to fit over the elongated portion of the reusable twist tie.

The first portion and the second portion can have a clamshell configuration to sandwich the elongated portion of the reusable twist tie therebetween.

The post can be circular in cross section. A length of the post in the longitudinal direction can be at least twice an outer diameter of the elongated portion of the reusable twist tie.

The surface of the second end can be a lower surface of a cylindrical disk at the second end. Half a difference between an outer diameter of the post and an outer diameter of the cylindrical disk can be equal to or greater than an outer diameter of the elongated portion of the reusable twist tie.

The second end can include an other surface having an indicia provided thereon. The other surface can be removable from the second end.

The second end can comprise first and second cleats extending from the post, a free end of the first and second cleats can extend in opposing directions.

The surface of the second end can be oval.

Also provided is a reusable twist tie comprising: an elongated core formed of a malleable material; an outer cover for covering the core, the outer cover being formed of an elastomer; first and second end caps formed of a material having a greater hardness than the outer cover, the first and second end caps being disposed at corresponding ends of the outer cover; wherein one or more of the first and second end caps comprises a tie post, the tie post comprising; a first end integrally formed with one or more of the first and second end caps; a post extending in a longitudinal direction from the first end configured for wrapping the outer cover around the post; and a second end having a surface for preventing the wrapped outer cover from moving in the longitudinal direction off of the post.

The post can be circular in cross section. A length of the post in the longitudinal direction can be at least twice an outer diameter of the outer cover.

The surface of the second end can be a lower surface of a cylindrical disk at the second end. Half a difference between an outer diameter of the post and an outer diameter of the cylindrical disk can be equal to or greater than an outer diameter of the elongated portion of the reusable twist tie.

The second end can include an other surface having an indicia provided thereon. The other surface can be removable from the second end.

BRIEF DESCRIPTION OF THE DRAWINGS

In FIGS. 14 and 15, the indicia shown is a registered Trademark of Sterling Mets, L.P.

DETAILED DESCRIPTION

Figure 1:
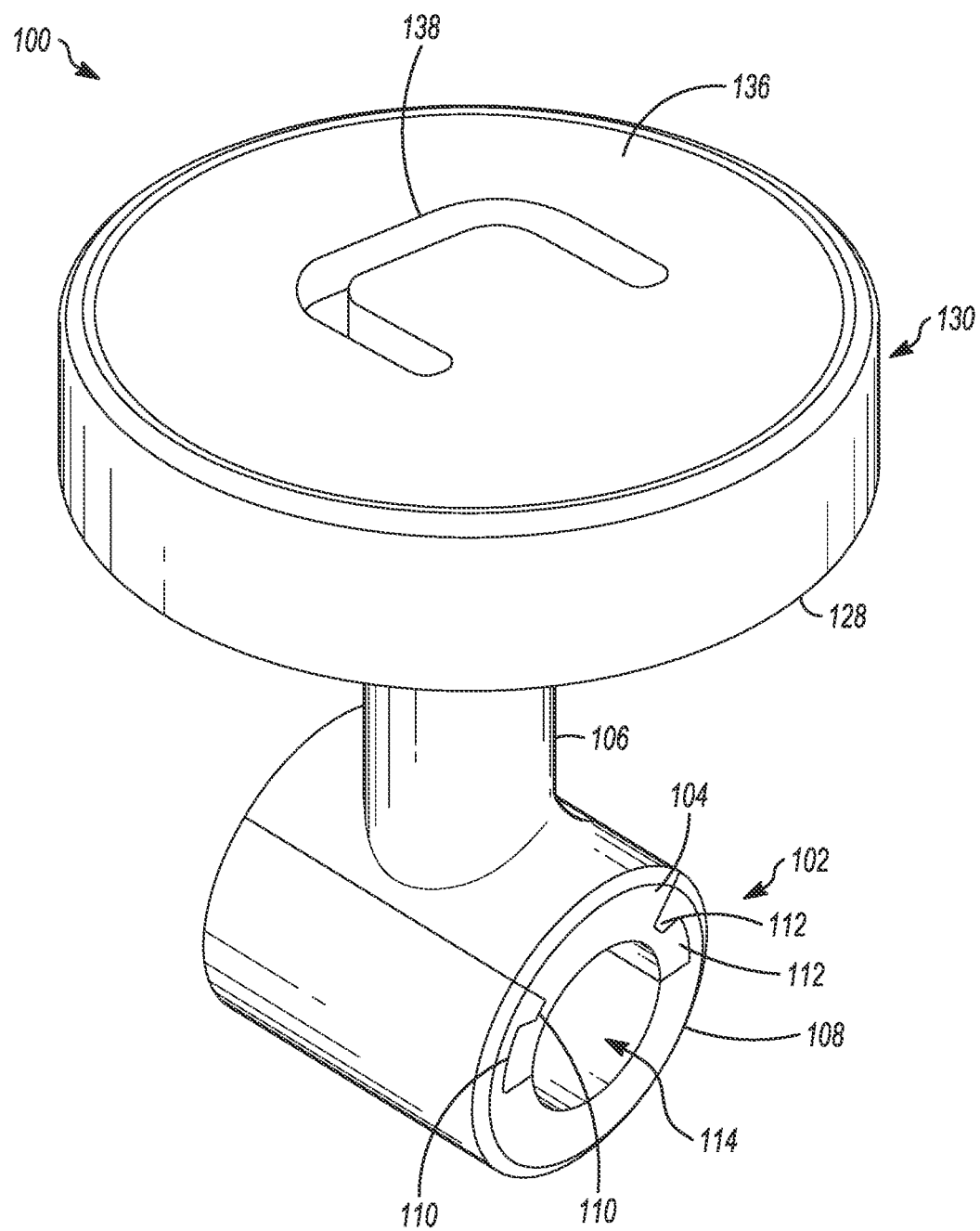
FIG. 1 illustrates a first embodiment of a tie post for use with a reusable twist tie.

Referring now to FIGS. 1-6, there is shown a tie post, generally referred to by reference numeral 100, for use with a reusable twist tie. As known in the art, the reusable twist tie 120 includes an elongated portion 118 having an elongated core formed of a malleable material, such as a metallic wire and an outer cover for covering the core, the outer cover is generally formed of an elastomer, such as rubber. The reusable twist tie also has first and second end caps 122 disposed at corresponding ends of the outer cover. The first and second end caps being generally formed of a material having a greater hardness than the outer cover, such as a hard plastic.

Figure 2:
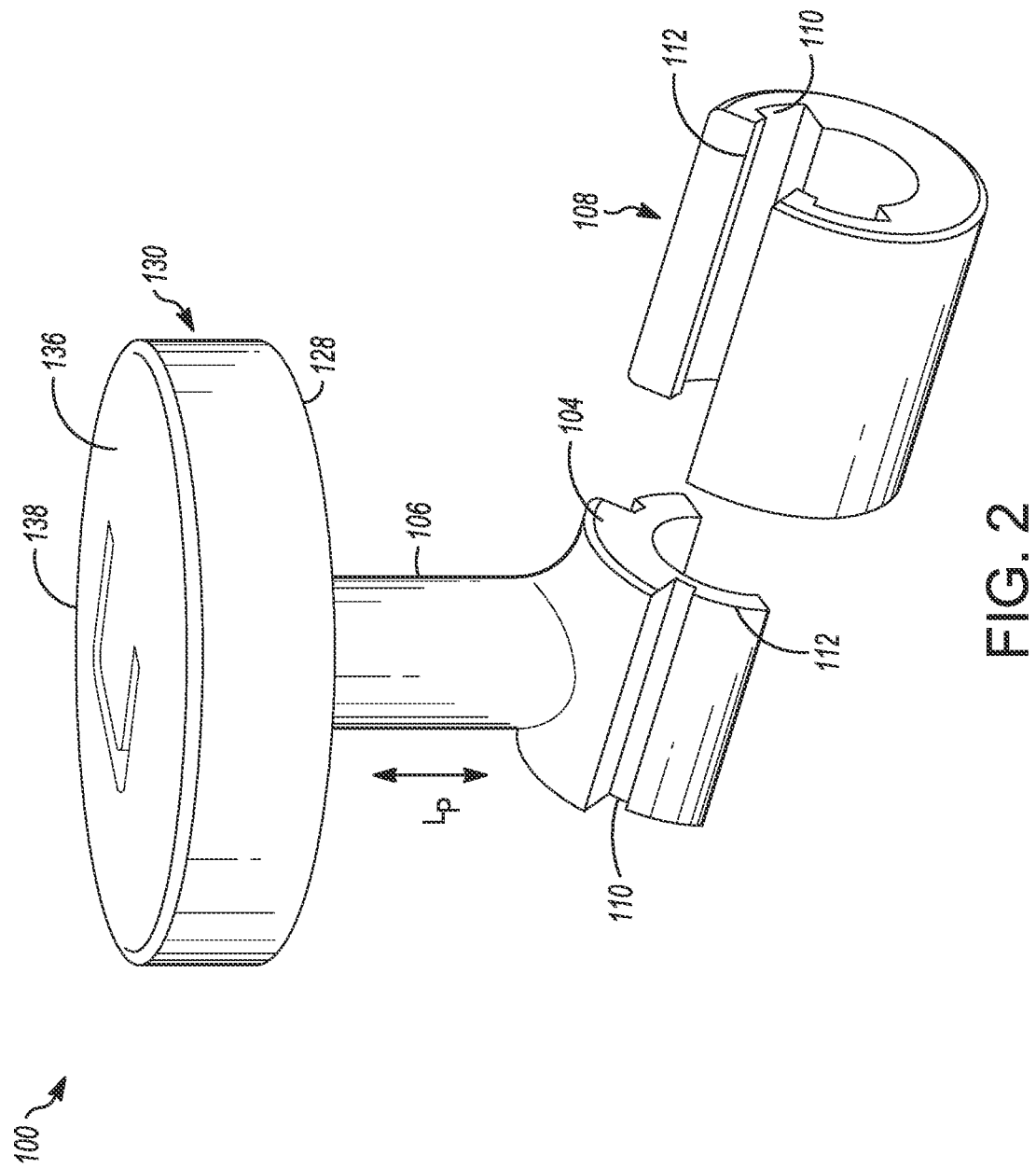
FIG. 2 illustrates the tie post of FIG. 1 in an unassembled state.
Figure 3:
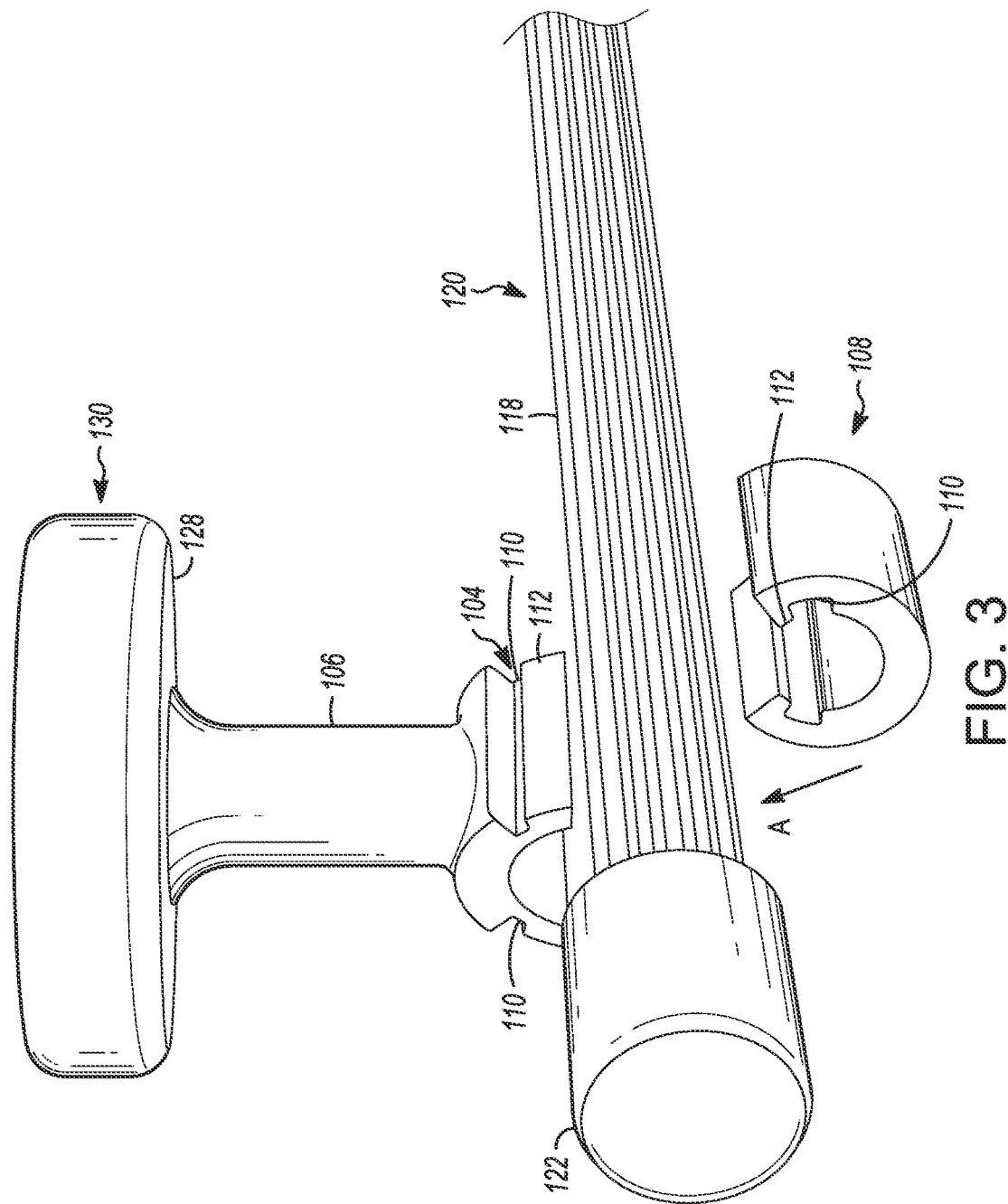
FIG. 3 illustrates the tie post of FIG. 2 in the unassembled state relative to a reusable twist tie.

The tie post can be formed, such as by injection molding from plastic or other resilient materials. A first end 102 of the tie post 100 is configured for removable attachment to the reusable twist tie. In a first configuration of the first end shown in FIG. 1, a first portion 104 is integrally formed with a post 106 and a second portion 108 is removably attached to the first portion 104, as shown in FIGS. 1 and 2. The first and second portions 104, 108 can have a concavity 110 and/or a mating projection 112 that securely fit together such as by a sliding contact as shown in FIG. 2.

Figure 4:
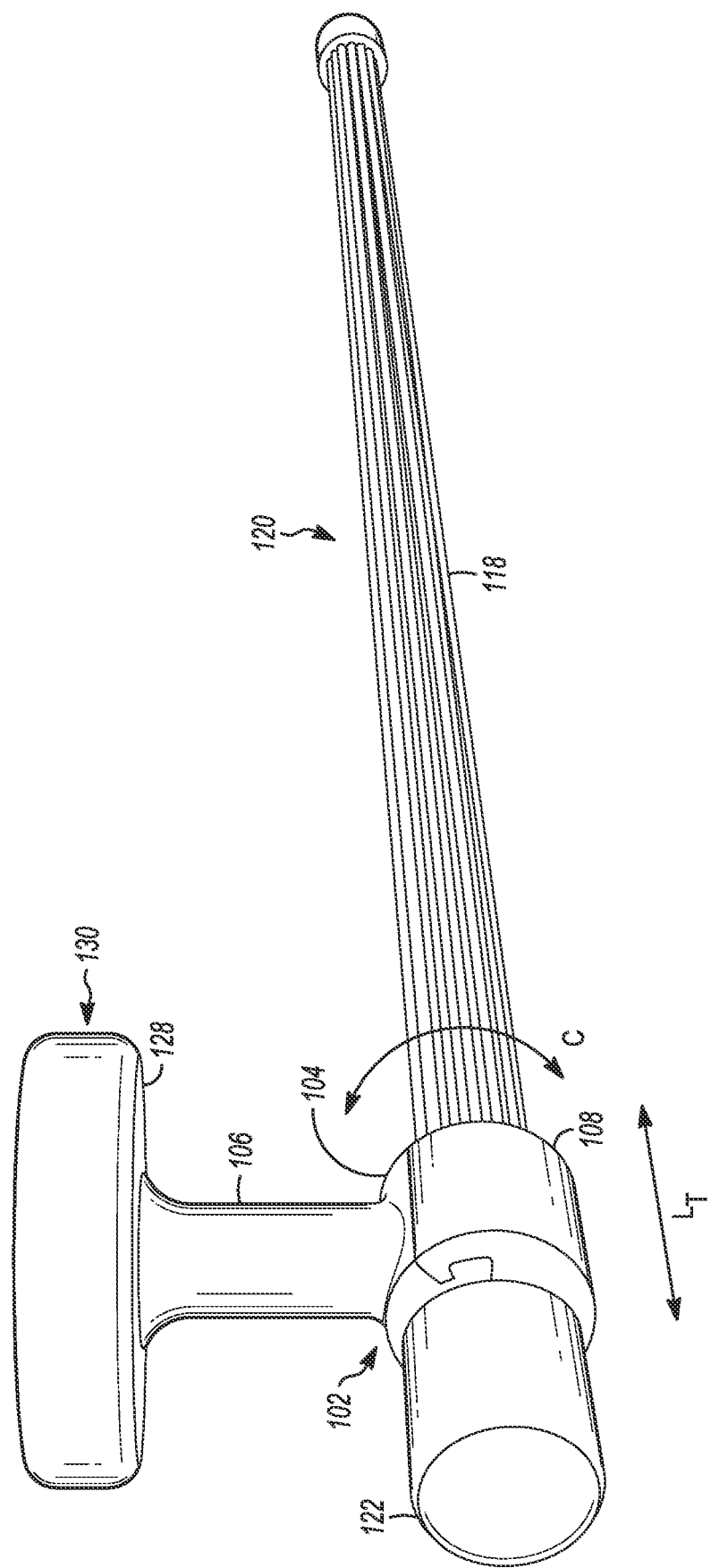
FIG. 4 illustrates the tie post of FIG. 3 in an assembled state to the reusable twist tie.
Figure 5:
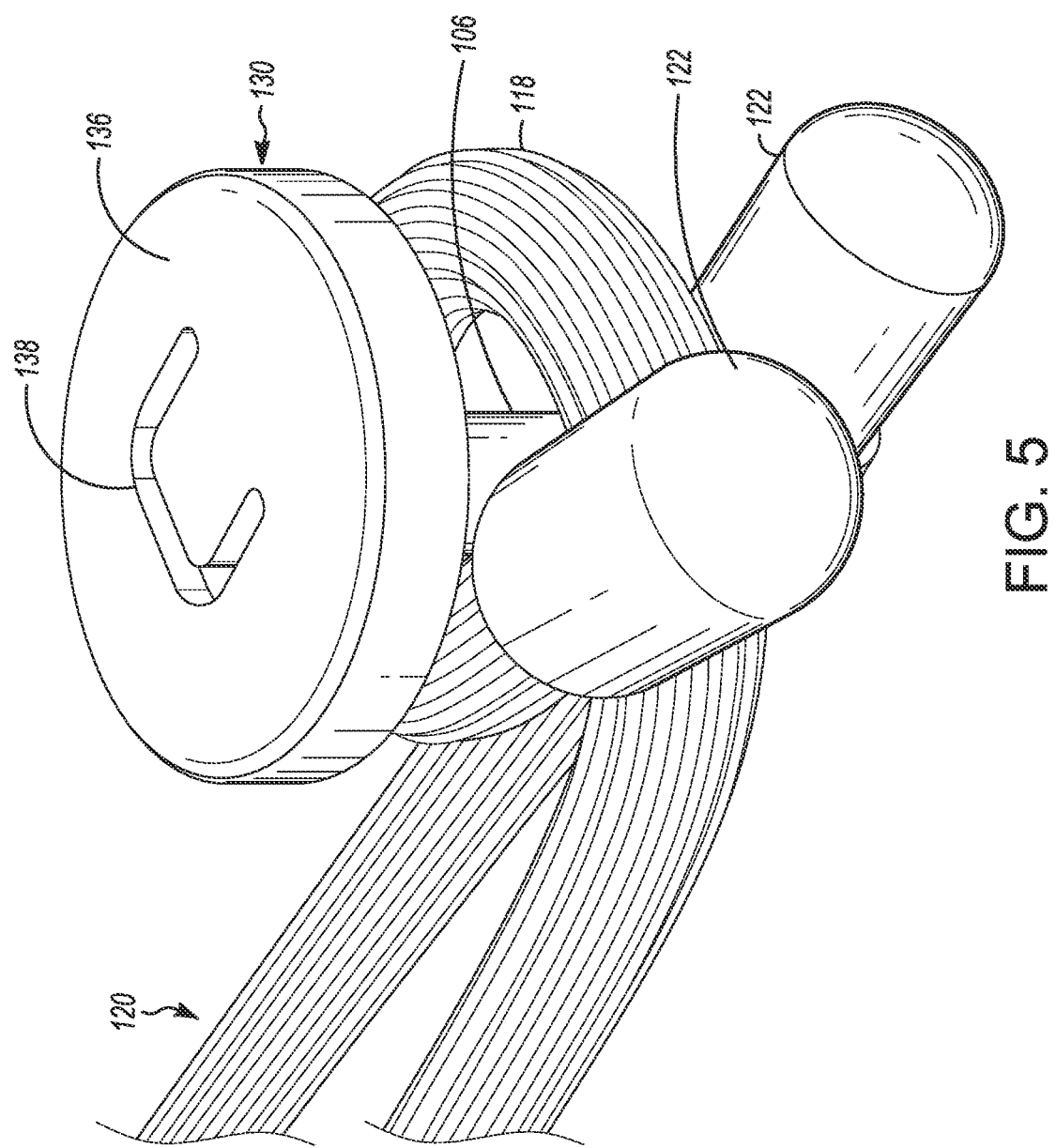
FIGS. 5 and 6 illustrate another end of the reusable twist tie being secured to the tie post of FIG. 4.
Figure 6:
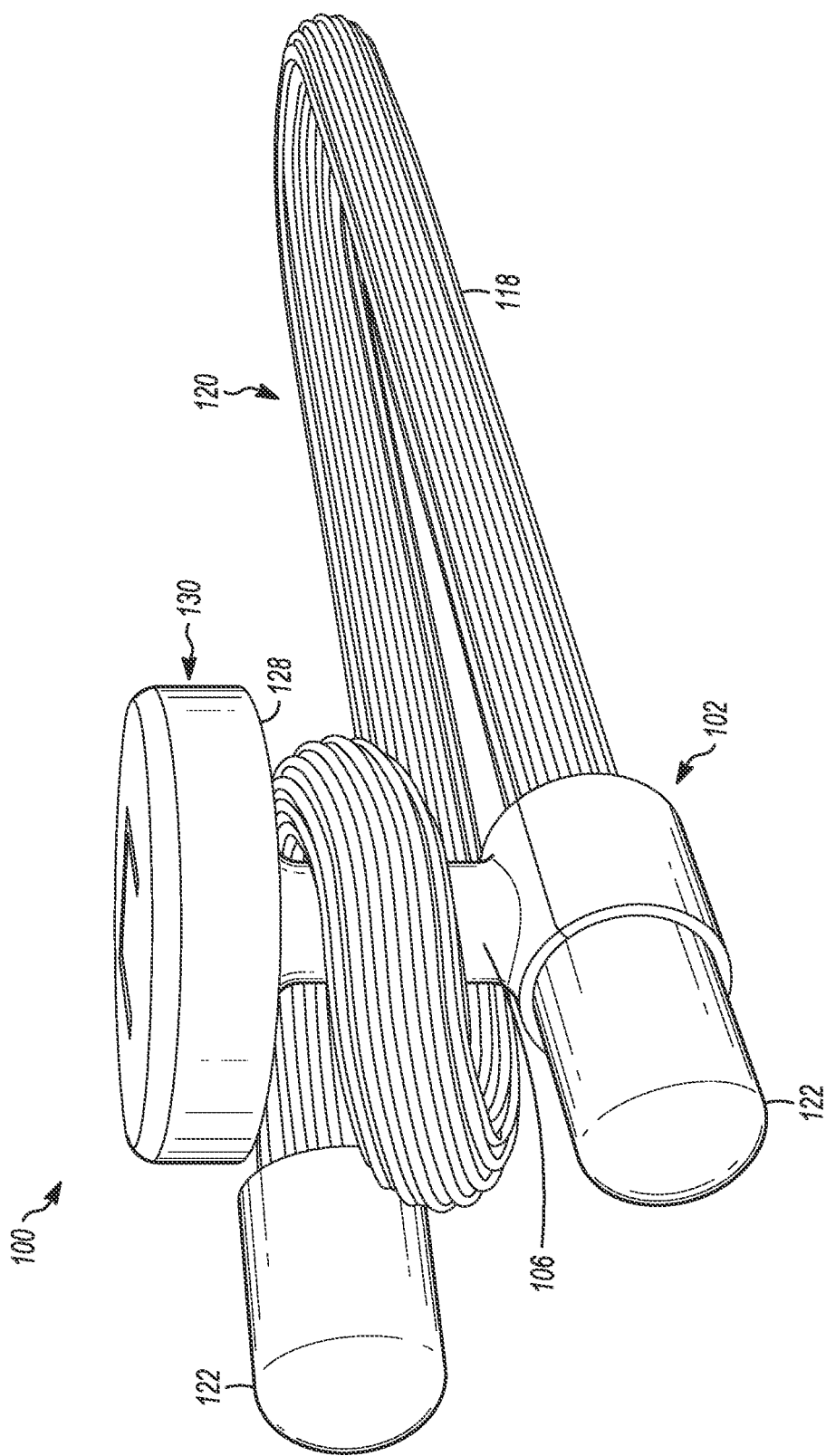

Alternatively, the second portion 108 can be configured to elastically deform such that the projection(s) 112 mate with the concavity(ies) 110. In such alterative, the free ends of the second portion 108, when pushed towards the free ends of the first portion 104 (see Arrow A in FIG. 3) plastically deform radially outward and then return when the projection(s) 112 align with the concavity(ies) 110. Such a fit may be known in the art as a "snap" fit. When the first and second portions are in the attached state as shown in FIG. 1, they define a through hole 114, through which the elongated portion 118 of the reusable twist tie 120 is disposed, as shown in FIG. 4. Such through hole 114 may have an inner diameter slightly smaller than the outer diameter of the elongated portion 118 of the reusable twist tie 120 so as to be secured thereon such that movement in a longitudinal direction $L_T$ or circumferential direction C of the elongated portion 118 of the reusable twist tie 120 is not permitted.

Figure 7:
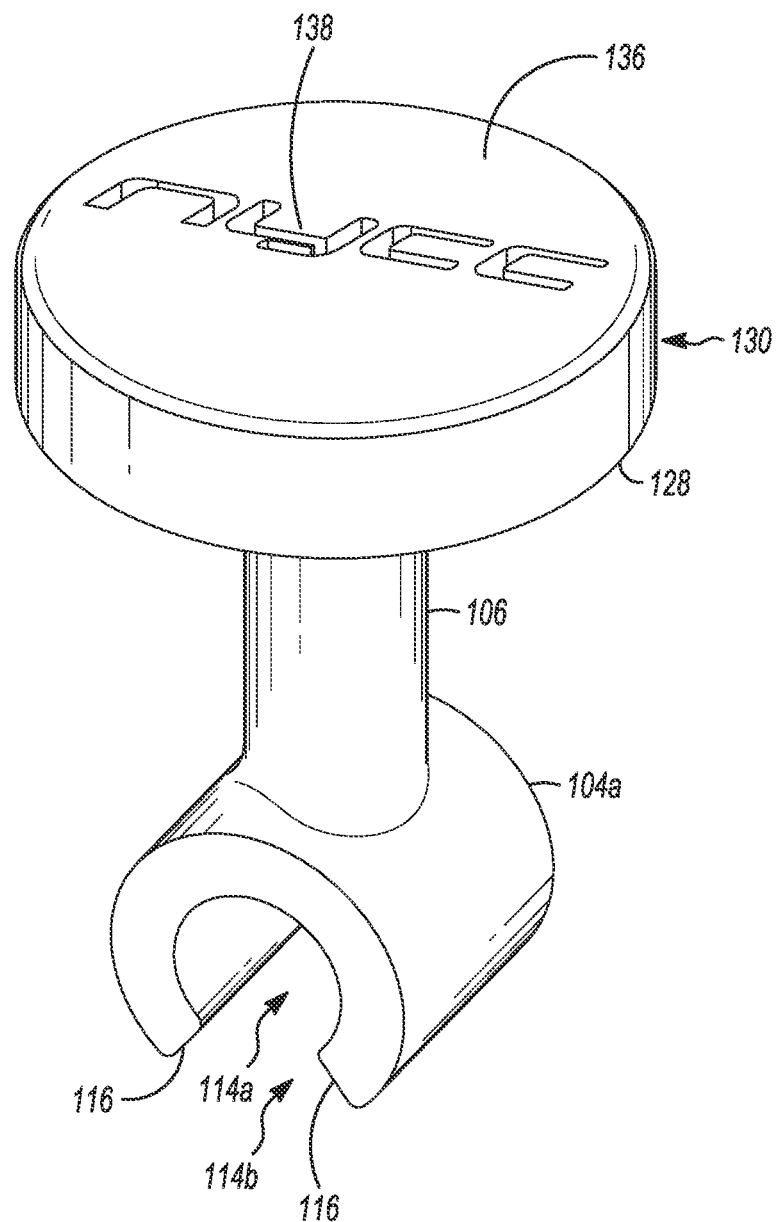
FIG. 7 illustrates a variation of the tie post of the first embodiment of FIG. 1.

In another configuration of the first end shown in FIG. 7, a first portion 104a is integrally formed with a post 106 where the first end 104a has first and second free ends 116 defining a c-shape in cross section having a through hole 114a which is open on one side 114b. In such configuration, the first portion 104a is formed of a material and is configured to elastically deform to fit over the elongated portion of the reusable twist tie such that the first and second free ends 116 of the first portion 104a, when pushed towards the elongated portion of the reusable twist tie to plastically deform radially outward and then return when the first and second free ends 116 pass over outer diameter of the elongated portion of the reusable twist tie. Such through hole 114a may have an inner diameter slightly smaller than the outer diameter of the elongated portion 118 of the reusable twist tie 120 so as to be secured thereon such that movement in a longitudinal direction $L_T$ or circumferential direction C of the elongated portion 118 of the reusable twist tie 120 is not permitted.

Figure 12:
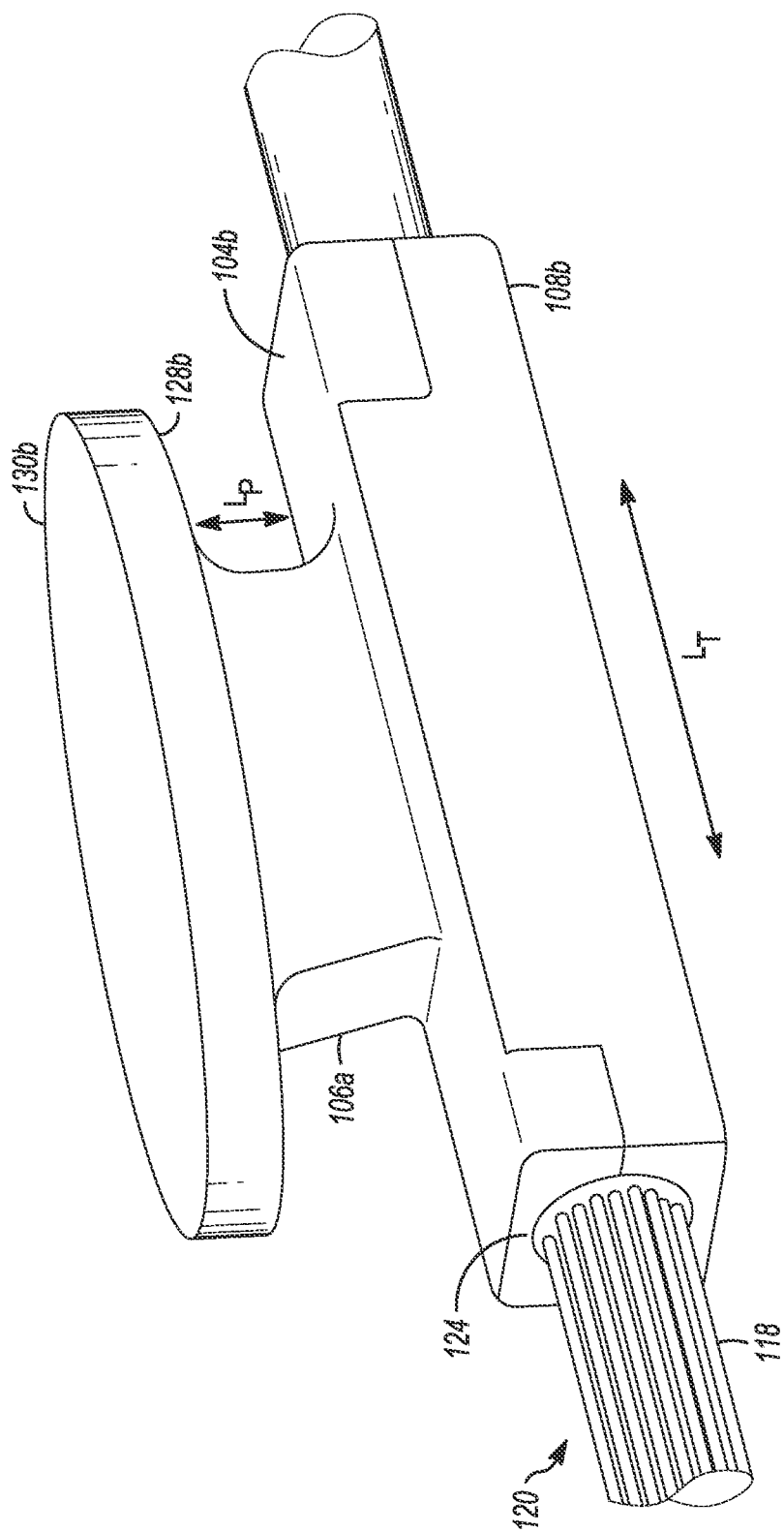
FIGS. 12 and 13 illustrate the tie post of FIG. 11 having a clam-shell type attachment to the reusable tie post.
Figure 13:
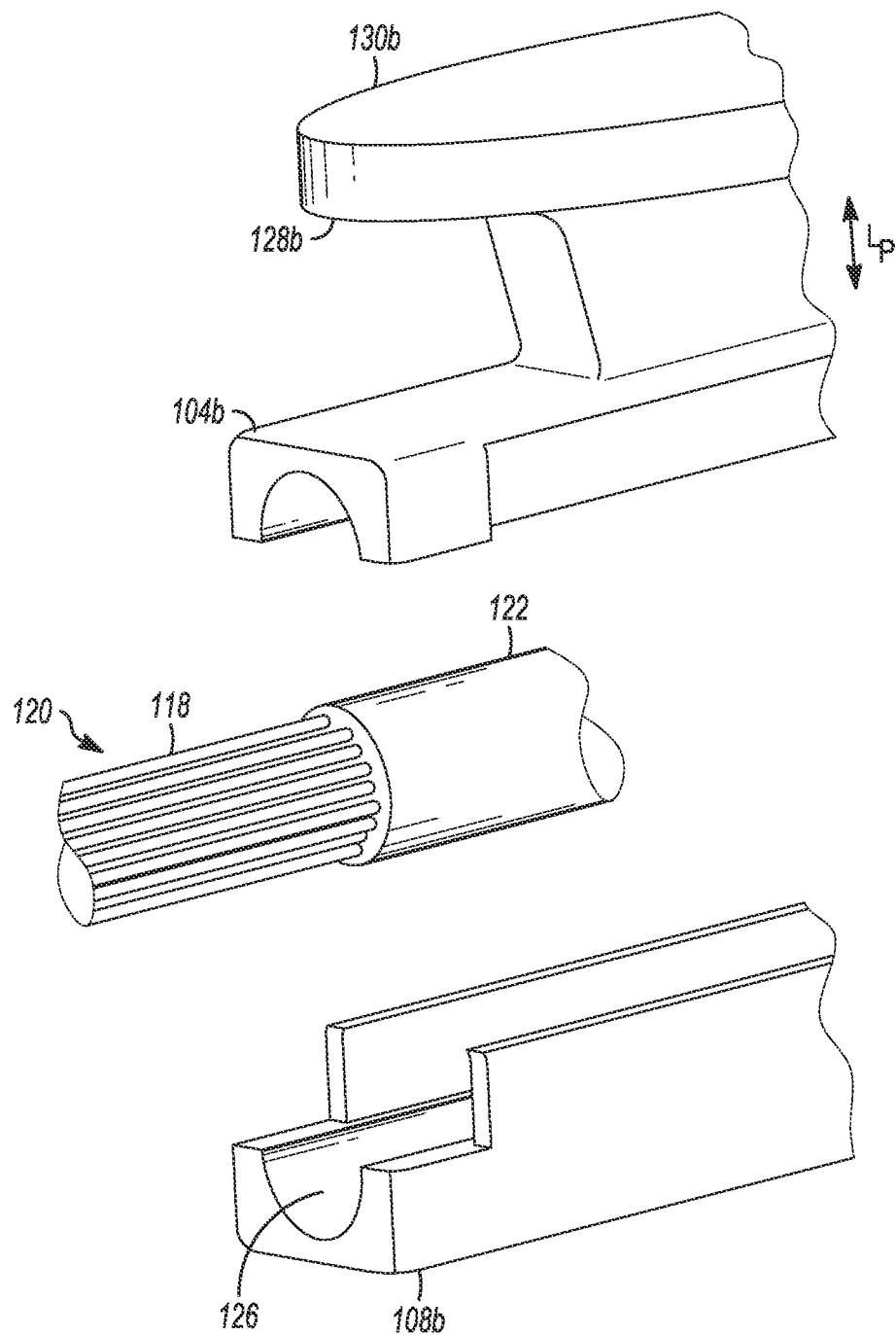

In yet another configuration of the first end, as shown in FIGS. 12 and 13, a first portion 104b and a second portion 108b can have what is known in the art as a clamshell configuration which sandwiches the elongated portion 118 of the reusable twist tie 120 therebetween. In such configuration, the first and second portions 104b, 108b (first and second clamshells) can capture the elongated portion 118 of the reusable twist tie 120 along an entire longitudinal length $L_T$ of the first and second portions 104b, 108b or only a portion of the elongated portion 118 of the reusable twist tie 120, which may include an end cap 122. The first and second portions 104b, 108b, when mated, define a through hole 124 to snugly fit over the outer diameter of the elongated portion 118 or may define a blind hole 126 to snugly fit over an end of the elongated portion 118, which may include a larger portion of the blind hole 126 to accommodate the end cap 122. Such first and second portions 104b, 108b can have projections and mating concavities, as is known in the art, for releasably connecting the same together. As with the configurations discussed above, such through hole 124 or blind hole 126 may have an inner diameter slightly smaller than the outer diameter of the elongated portion 118 of the reusable twist tie 120 so as to be secured thereon such that movement in a longitudinal direction $L_T$ or circumferential direction C of the elongated portion 18 of the reusable twist tie 120 is not permitted.

Figure 9:
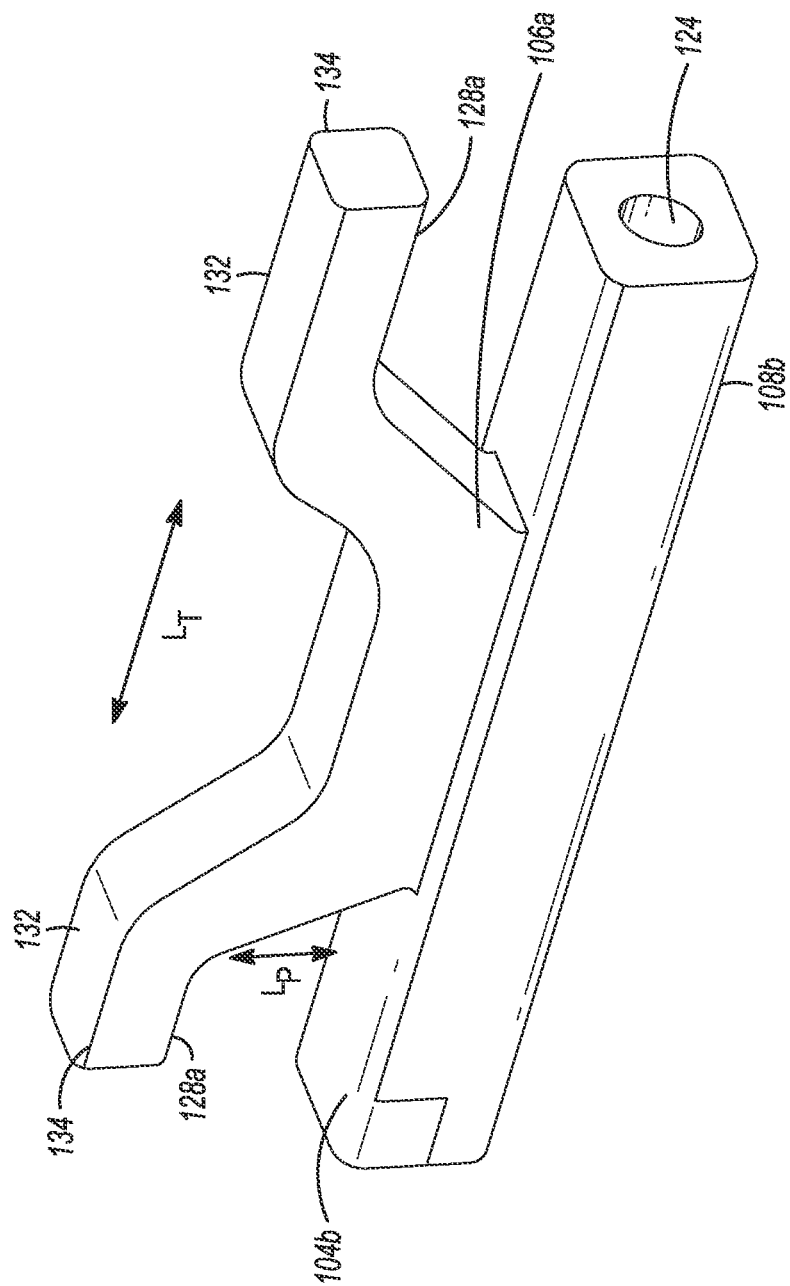
FIG. 9 illustrates a third embodiment of a tie post having a boat cleat configuration.

Referring back to FIGS. 1-6, the tie post 100 further includes the post 106 extending in a longitudinal direction $L_P$ from the first end 104 to a surface 128 for preventing an wrapped elongated portion 118 of the reusable twist tie 120 from moving in the longitudinal direction $L_P$ off of the post 106, as is shown in FIGS. 5 and 6. The post is configured for wrapping the elongated portion 118 of the reusable twist tie 120 around the post 106. As shown in FIG. 1, the post 106 can be circular in cross section. A length of the post 106 can be at least twice an outer diameter of the elongated portion 118 of the reusable twist tie 120 so as to accommodate at least 2 wraps of the elongated portion 118 around the post 106. In an alternative configuration, as shown in FIGS. 9 and 12, the post 106a can be elongated in the $L_T$ direction. Furthermore, although the post 106, 106a are shown to be singular, more than one post can be used to extend between the first end 104, 104a, 104b and the surface 128 that that prevents the wrapped elongated portion 118 of the reusable twist tie 120 from moving in the longitudinal direction $L_P$ off of the post, in which case an equal number of separate surfaces 128 may be provided corresponding to each post.

Referring back to FIG. 1, a second end 130 of the tie post 100 has the surface 128 for preventing the wrapped elongated portion 118 of the reusable twist tie 120 from moving in the longitudinal direction $L_P$ off of the post 106. In the configuration shown in FIG. 1, the second end 130 is a cylindrical disk and the surface 128 is a lower surface of a cylindrical disk that attaches to the post 106. An outer diameter of the second end 130 can be any size that prevents the wrapped elongated portion 118 of the reusable twist tie 120 from moving in the longitudinal direction $L_P$ off of the post 106. For example, the outer diameter of the second end 130, when configured as a cylindrical disk can be such that an amount of the surface 128 that overhangs from the post 106 is about the same as an outer diameter of the elongated portion 118 of the reusable twist tie 120. In other words, half of a difference between an outer diameter of the post 106 and an outer diameter of the cylindrical disk is equal to or greater than an outer diameter of the elongated portion 118 of the reusable twist tie 120.

Although the first end, 102, post 106 and second end 130 are shown integrally formed in a single piece, such features may be formed in two or more separate pieces and assembled together, such as with adhesive or other fasteners.

Figure 10:
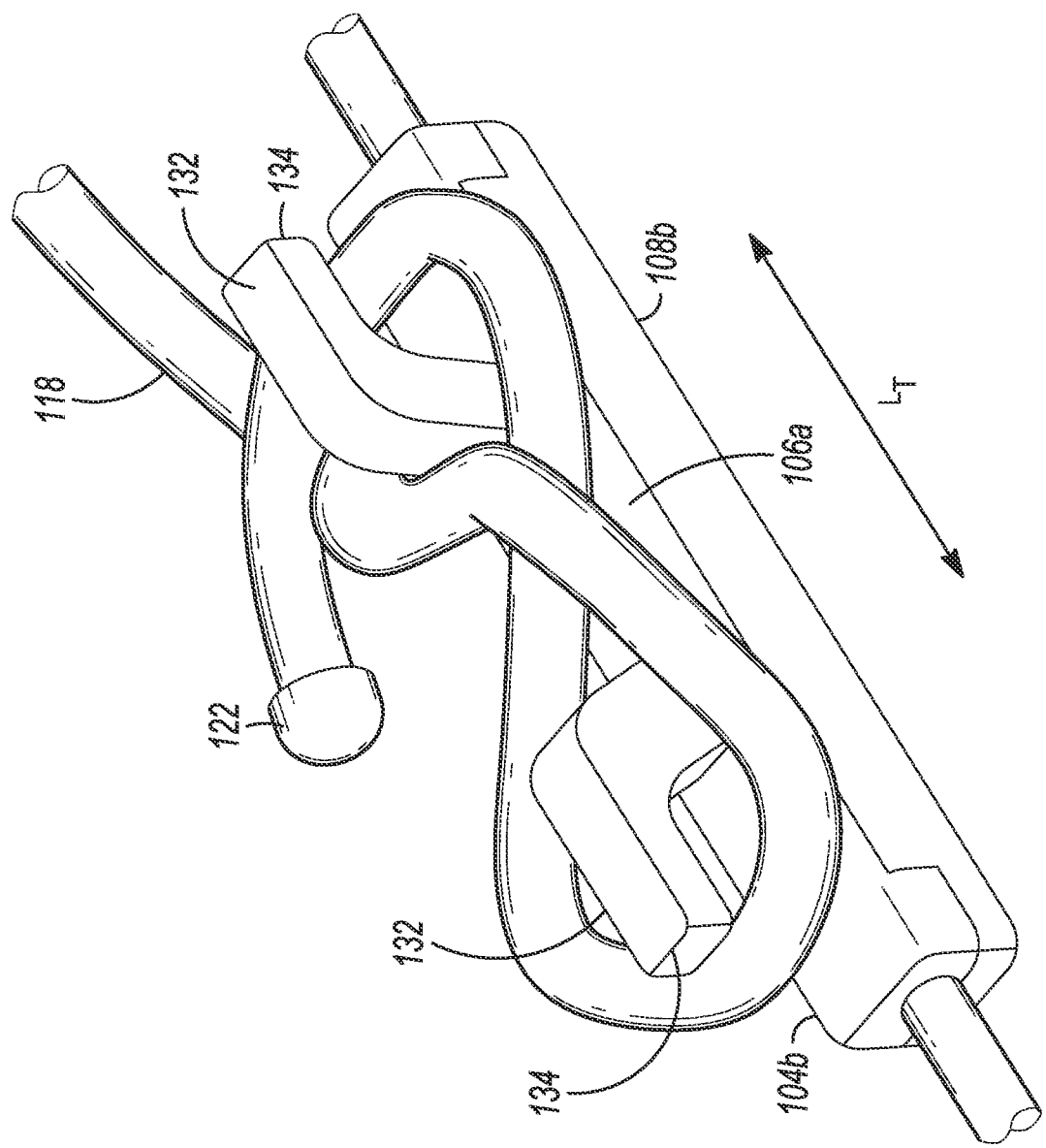
FIG. 10 illustrates the tie post of FIG. 9 having a reusable twist tie secured thereto.

As shown in FIG. 9, the surface 128a can be elongated in the $L_T$ direction where the second end comprises first and second cleats 132 extending from the post 106a, a free end 134 of the first and second cleats 132 extending in opposing directions in the $L_T$ direction. A configuration of such cleats is well known in the art, particularly in the boating art in which the elongated portion 118 of the reusable twist tie 120 can be wrapped around the post 106a and cleats 132 in a manner known in the boating arts, such as that shown in FIG. 10. Although the configuration of the tie post in FIGS. 9 and 10 is shown with the clamshell configuration at the first end (discussed above with regard to FIGS. 12 and 13), any of the above first end configurations can also be utilized.

Furthermore, the reusable twist tie 120 can be used in the configuration of FIG. 9 to secure the tie post having such first and second cleats 132 to another object, such as a boat railing. In such configuration, the tie post having the cleats 132 can be used with a rope to tie down the boat, thereby adding an additional boat cleat to the boat. Additionally, the tie post in the configuration of FIG. 9 can be alternatively used with a rope disposed through the hole 124 where the rope can be used to secure the tie post to another object or alternatively, the rope can be used to secure to the first and second cleats 132.

Figure 11:
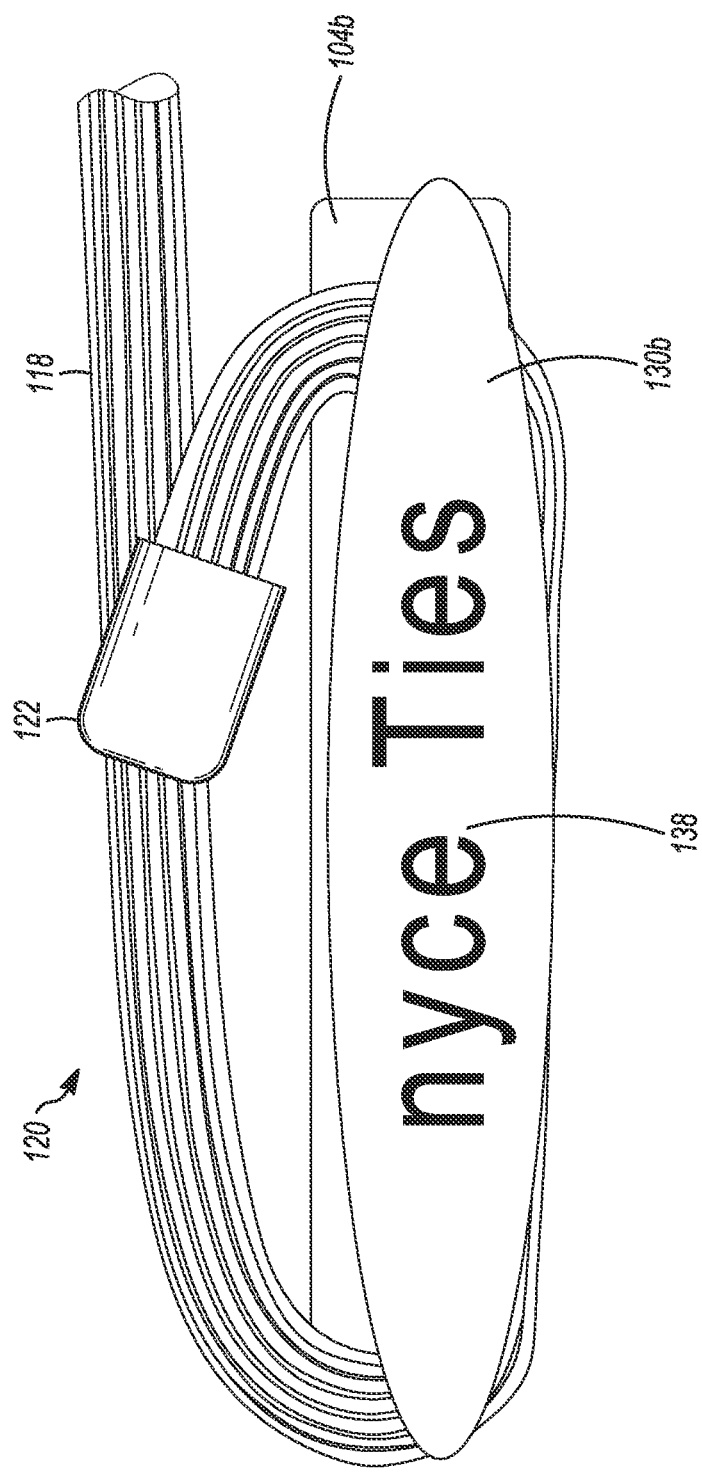
FIG. 11 illustrates a fourth embodiment of tie post for use with a reusable twist tie.

As shown in FIG. 12, the surface 128*b* can be elongated in the $L_T$ direction such that the second end 130*b* has an elongated shape in the $L_T$ direction, such as an elongated or oval shaped disk. The tie post as shown in FIG. 12 can accommodate the elongated portion 118 of the reusable twist tie 120 as shown in FIG. 11. Although the configuration of the tie post in FIGS. 12 and 13 is shown with the clamshell configuration at the first end, any of the above first end configurations can also be utilized.

Figure 14:
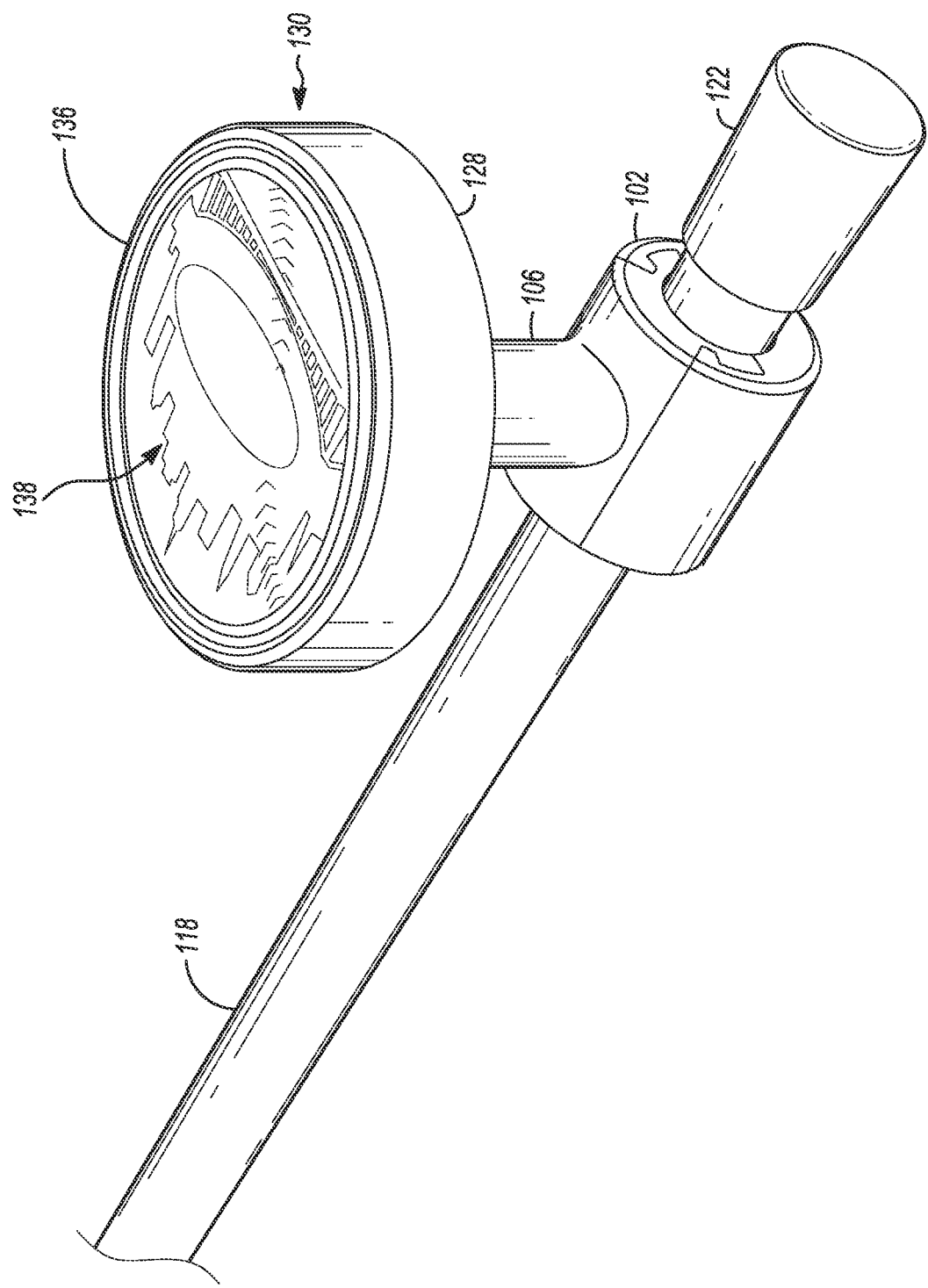
FIG. 14 illustrates a variation of tie post having an indicia formed on a surface thereof.
Figure 15:
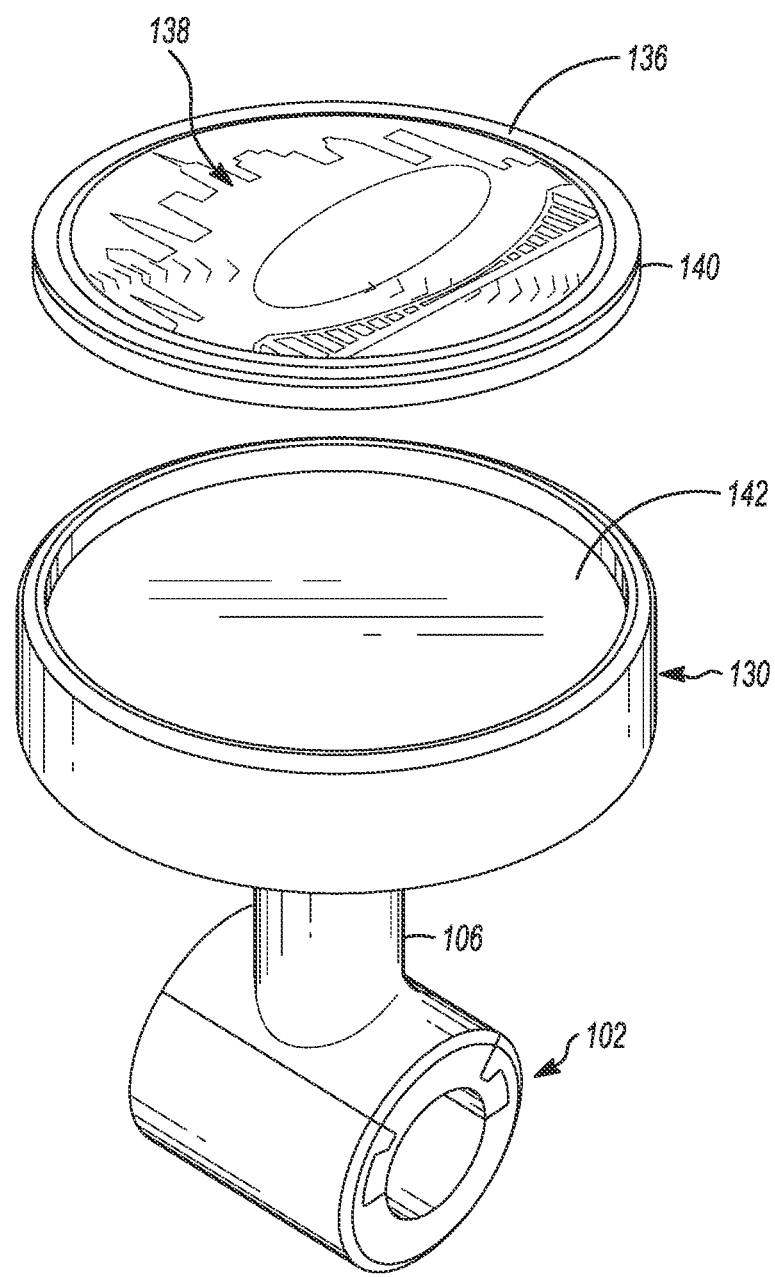
FIG. 15 illustrates the tie post of FIG. 14 where the indicia is removable and replaceable.

As shown in FIG. 1, the second end 130 can include an other surface 136, such as the top surface of the cylindrical disk having an indicia 138 provided thereon. Such indicia can be writing, a company logo, an illustration, an image etc. As shown in FIG. 14, the indicia 138 can be a logo, such as a sports team printed and/or otherwise disposed (such as engraving) on the other surface 136. In addition, the indicia can be a seasonal image, such as a snowflake for winter, a Christmas tree for Christmas holidays, a school or university logo/name or a company name. As shown in FIG. 15, the other surface 136 having the indicia 138 can be part of an insert 140, which is disposed on the second end 130 or fits within a corresponding concavity 142 on the second end 130. In the configuration shown in FIG. 15, the insert 140 is a thin cylindrical disk and the corresponding concavity 142 is also cylindrical. The insert 140 can fasten to the second end 130 by any means known in the art, such as a press fit, snap-fit, magnetic attraction etc., such that the fit is releasable. In which case, inserts 140 having different indicia can be interchanged with one another. In addition, the insert 140 can be fixed to the second end 130, such as by adhesive.

Figure 8:
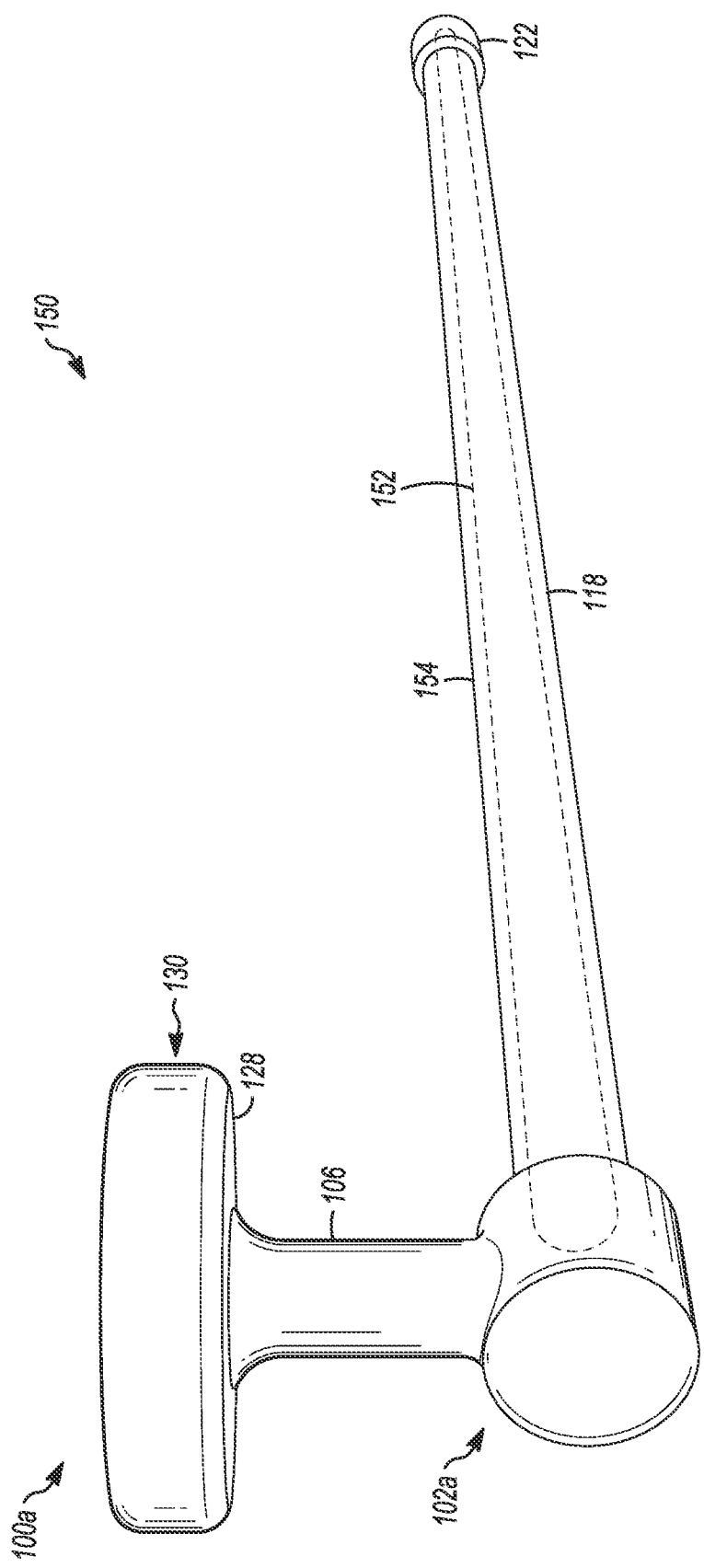
FIG. 8 illustrates a second embodiment of a tie post being integrally formed on an end of the reusable twist tie.

Referring now to FIG. 8, there is shown an embodiment of a reusable twist tie, generally referred to by reference number 150. The reusable twist tie 150 having an elongated core formed of a malleable material 152 and an outer cover 154 for covering the core 152. As discussed above, the malleable material can be a metallic wire and the outer cover can be formed of an elastomer, such as rubber. First and second end caps are disposed at corresponding ends of the outer cover 154 and formed of a material having a greater hardness than the outer cover, such as a hard plastic.

However, at least one of the first and second end caps comprises a tie post 100*a* where a first end 102*a* of the tie post 100*a* is integrally formed with the first and/or second end caps. In the configuration shown in FIG. 8, the reusable twist tie 150 includes one end cap 122 having a conventional configuration and another end cap being the first end 102*a* and corresponding tie post 100*a*. However, each end cap may be configured as a tie post either having a same configuration or different configurations.

Although the tie post 100*a* is shown in FIG. 8 as having a configuration similar to that of FIG. 1 (with the exception of the first end 102*a*), such tie post can have any of the configurations discussed above with a corresponding first end integrally formed with the end cap.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A tie post for use with an elongated member, the tie post comprising:
    a first end being configured for removable attachment to the elongated member;
    a post extending from the first end in a first direction that is orthogonal to a longitudinal direction of the elongated member, the post further being elongated in the longitudinal direction of the elongated member, the post being configured for wrapping an elongated portion of the elongated member around the post; and
    a second end having first and second cleats extending from the post for preventing the wrapped elongated portion of the elongated member from moving in the first direction off of the post;
    wherein a free end of the first and second cleats extending in opposing directions in the longitudinal direction and each of the first and second cleats having a rod shape.

2. The tie post of claim 1, wherein the first end comprises a first portion integrally formed with the post and a second portion removably attached to the first portion.

3. The tie post of claim 2, wherein the first portion has one of a concavity and a projection and the second portion has the other of the concavity and the projection and the second portion is configured to elastically deform such that the projection mates with the concavity.

4. The tie post of claim 2, wherein the first portion and the second portion having a clamshell configuration to sandwich the elongated portion of the elongated member therebetween.

5. The tie post of claim 1, wherein the elongated member is one of a reusable twist tie or a rope.

6. The reusable twist tie of claim 1, wherein a portion of the post between the first and second cleats extends in the first direction orthogonal to the longitudinal direction less than the cleats extend in the first direction.

7. The reusable twist tie of claim 6, further comprising first and second transition portions disposed between the post and the first and second cleats, respectively, the first and second transition portions extending from the post at a second direction between the longitudinal direction and the orthogonal direction.

* * * * *